United States Patent [19]
Suzuoki et al.

[11] Patent Number: 5,774,125
[45] Date of Patent: *Jun. 30, 1998

[54] TEXTURE MAPPING METHOD IN WHICH 3-D IMAGE DATA IS TRANSFORMED INTO 2-D DATA AND MAPPED ONTO A SURFACE OF AN OBJECT FOR DISPLAY

[75] Inventors: Masakazu Suzuoki, Tokyo; Makoto Furuhashi, Kanagawa, both of Japan

[73] Assignee: Sony Corporation, Tokyo, Japan

[*] Notice: The term of this patent shall not extend beyond the expiration date of Pat. No. 5,537,224.

[21] Appl. No.: 611,624

[22] Filed: Mar. 6, 1996

Related U.S. Application Data

[63] Continuation-in-part of Ser. No. 154,620, Nov. 18, 1993, Pat. No. 5,537,224.

[51] Int. Cl.⁶ .................................................. G06T 15/00
[52] U.S. Cl. ........................................................ 345/430
[58] Field of Search .................................. 395/130, 120, 395/125, 126, 127, 133, 139; 345/139, 430; 382/276

[56] References Cited

U.S. PATENT DOCUMENTS

| | | | |
|---|---|---|---|
| 4,727,365 | 2/1988 | Bunker et al. | 345/139 |
| 5,420,940 | 5/1995 | Sedlar et al. | 382/276 |
| 5,438,654 | 8/1995 | Drebin et al. | 395/139 |
| 5,537,224 | 7/1996 | Suzuoki et al. | 395/130 X |

*Primary Examiner*—Almis R. Jankus
*Attorney, Agent, or Firm*—Jay H. Maioli

[57] ABSTRACT

A real time texture mapping method produces an image of an object having a surface that has dynamically changing texture by using image data and moving image texture pattern data. The image data is stored in a drawing area of an image memory, and the moving image texture pattern data is stored frame-by-frame in a texture area of the image memory. The moving image texture pattern data stored in the texture area is mapped a frame per vertical display period onto the surface of the object which is represented in the image data stored in the drawing area. The new two-dimensional image data having the texture pattern data mapped on the surface of the object is used as a current image frame for display. The new image data having the texture pattern data mapped on the surface of the object may be stored in the texture area of the image memory, and used as a new texture pattern to map onto a second object stored in the drawing area for a next image frame to be displayed. A video game apparatus implementing this method includes the image memory having a display area as well as the texture area and drawing area. The display area stores image data of the current image frame for display. The drawing and display areas have interchangeable functions.

14 Claims, 7 Drawing Sheets

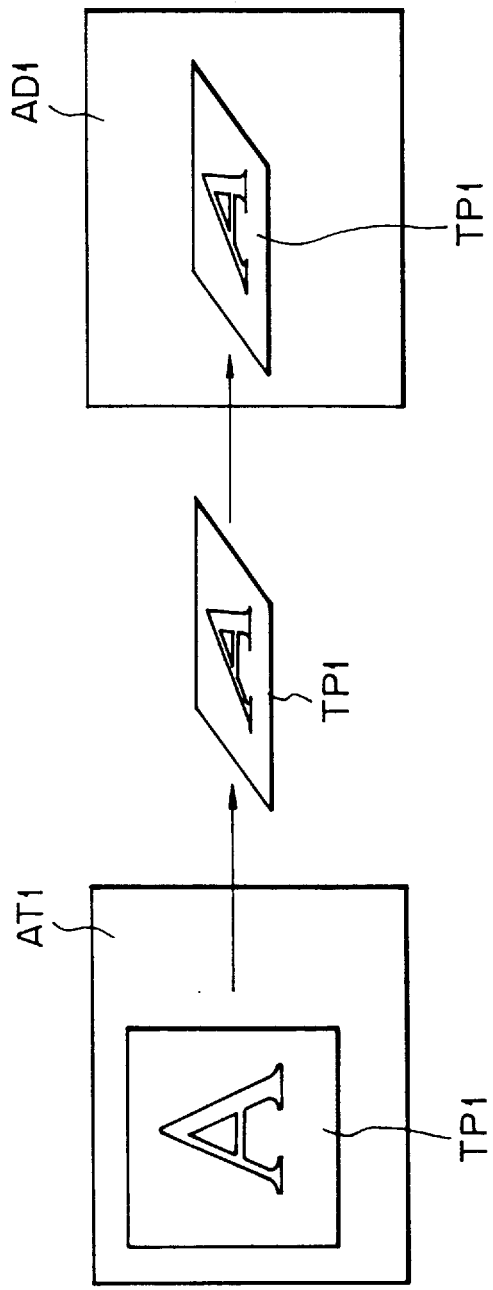

TEXTURE MAPPING METHOD IN WHICH 3-D IMAGE DATA IS TRANSFORMED INTO 2-D DATA AND MAPPED ONTO A SURFACE OF AN OBJECT FOR DISPLAY

This is a continuation in part of application Ser. No. 08/154,620, filed Nov. 18, 1993, now U.S. Pat. No. 5,537,224.

BACKGROUND OF THE INVENTION

1. Field of the Invention

This invention relates generally to a texture mapping method for generating an image that has texture or ornamentation on its surfaces and, more specifically, a real time texture mapping method for generating an image by adhering frame-by-frame a moving image as a texture pattern to a surface of an object in the image to be displayed, such as an image for use in a computer game.

2. Description of the Background

In order to enjoy a computer game high-speed processing and an excellent graphics display capability are required. For such video games it is required to display a 3-dimensional object at a high speed, and to realize visual effects such as textures or the like, or to display other information with reality. The texture is intended to cause a visual effect that is peculiar to the particular 3-dimensional object by seemingly adhering a pattern, which can be separately defined, onto a surface of the 3-dimensional object. For example, a geometric pattern, a still pattern, such as a photograph, a hand drawing, or the like may be adhered to the surface of the object.

It is also desirable that a moving image can be used as a texture pattern in order to provide distinctive computer graphics. Hitherto, however, a texture pattern is predetermined and the texture pattern cannot dynamically be rewritten onto selected images. Therefore, the texture pattern of the moving image cannot be adhered to the surface of the object by using computer graphics.

Further, since the texture pattern cannot dynamically be rewritten as mentioned above, a texture having a large change cannot be adhered to the surface of the object.

Also, hitherto, the number of colors of the texture pattern is limited due to a limitation in a number of bits and a number of colors that can be expressed.

OBJECTS AND SUMMARY OF THE INVENTION

Therefore, it is an object of the present invention to provide a real time texture mapping method that can dynamically adhere a texture pattern of a moving image to a surface of an object in an image to be displayed by using computer graphics.

Another object of the present invention is to provide a video game apparatus that can dynamically adhere a texture pattern of a moving image to an object in an image to be displayed by using computer graphics.

According to an aspect of the invention, there is provided a real time texture mapping method for producing an image of an object having a surface that has dynamically changing texture by using image data and moving image texture pattern data, the method including the steps of storing the image data in a drawing area of an image memory, storing the moving image texture pattern data frame-by-frame in a texture area of the image memory, and mapping a frame of the moving image texture pattern data stored in the texture area per vertical display period onto the surface of the object which is represented in the image data stored in the drawing area.

According to another aspect of the invention, there is provided a real time texture mapping method for producing a dynamically changing image by using image data of an object and texture pattern data, the method including the steps of storing the image data of the object in a drawing area of an image memory, storing the texture pattern data in a texture area of the image memory, mapping the texture pattern data stored in the texture area onto a surface of the object which is represented in the image data stored in the drawing area, storing in the texture area of the image memory the new two-dimensional image data having the texture pattern data mapped on the surface of the object therein as new texture pattern data, using the new two-dimensional image data having the texture pattern data mapped on the surface of the object therein as a current image frame for display, and using the new texture pattern data of the object having mapped thereon the texture pattern data as a new texture pattern to map onto a second object stored in the drawing area for a next image frame to be displayed.

According to still another aspect of the invention, there is provided a video game apparatus for producing a video signal corresponding to an image of an object having a dynamically changing texture by using three-dimensional image data and moving image texture pattern data, the apparatus including an image memory having a texture area for storing the moving image texture pattern data frame-by-frame, a display area for storing image data of a current frame being displayed, and a drawing area providing a work area for composing image data of a next frame to be displayed, and an image synthesizing unit for synthesizing a dynamically changing textured image of the object by using the image data stored in the drawing area and the texture image data stored in said image memory, the synthesizing including calculating slope data corresponding to the image data stored in the display area, determining polygons corresponding to respective surfaces of the object by using the slope data corresponding to the image data, and mapping the moving image texture pattern data frame-by-frame to an inner portion of one of the polygons.

According to yet another aspect of the present invention, the display and drawing areas of the image memory are functionally interchangeable, during a first vertical display period one of the display and drawing areas performing a first function of storing image data of a current frame being displayed and other of the display and drawing areas performing a second function as a work area for composing image data of a next frame to be displayed, and during a second vertical display period the one of the display and drawing areas performing the second function and the other of the display and drawing areas performing the first function.

The above and other objects, features, and advantages of the present invention will become readily apparent from the following detailed description thereof which is to be read in connection with the accompanying drawings.

BRIEF DESCRIPTION OF THE DRAWINGS

FIGS. 4A–4C are diagrams useful in explaining a first texture mapping operation in an embodiment of the present invention;

DETAILED DESCRIPTION OF PREFERRED EMBODIMENTS

Figure 1:
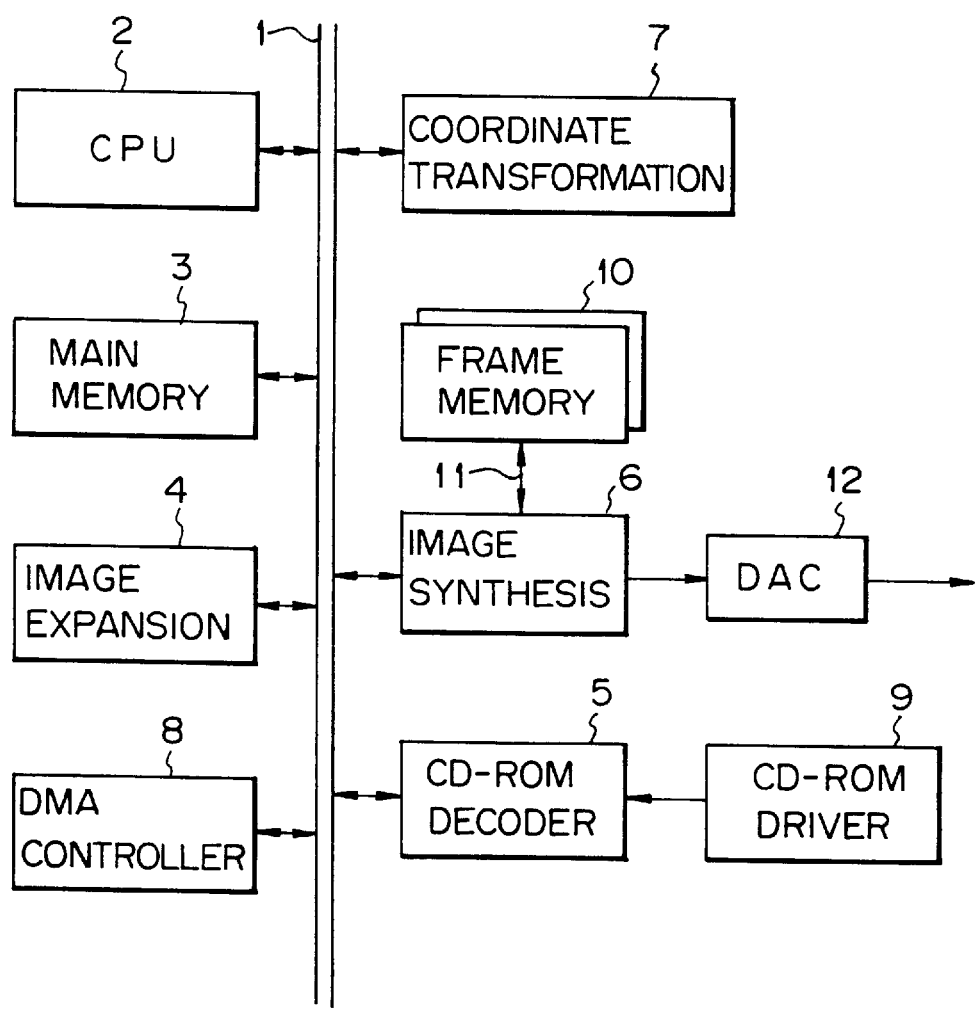
FIG. 1 is a block diagram of a video game apparatus of the present invention.

FIG. 1 shows one embodiment of the present invention, in which a CPU 2, a main memory 3, an image expansion unit 4, a CD-ROM decoder 5, an image synthesis unit 6, a coordinate transformation unit 7, and a DMA controller 8 are connected to a system bus 1.

A CPU of 32 bits is advantageously used as the CPU 2, and this CPU 2 manages the whole system. For example, the CPU 2 controls storage of data, such as polygon data, in the main memory, and sorts the polygon data to determine an order according to which the polygons will be drawn onto a screen.

The image expansion unit 4 executes an expanding process of image data that was compressed by a discrete cosine transform (DCT), for example.

The CD-ROM decoder 5 is connected to a CD-ROM driver 9 and decodes an application program or data from a CD-ROM loaded in the CD-ROM driver 9. Moving image data, which can be image data compressed by a DCT, can be recorded in the CD-ROM. The CD-ROM decoder 5 decodes the moving image data stored in the CD-ROM, and transfers the decoded compressed moving image data to the image expander 4. The compressed moving image data is expanded by the image expander 4, and the expanded moving image data is supplied frame-by-frame to a frame memory 10.

The frame memory 10 is connected to the image synthesis unit 6 through a local bus 11. The frame memory 10 includes a texture area for storing a texture image, a display area for storing image data of a current frame being displayed, and a drawing area provides a work area for composing image data of a next frame to be displayed. The display area and the drawing area are interchangeable and are swapped, for example, every vertical period. Further, a color lookup table (CLUT) is provided in the frame memory 10. The image synthesis unit 6 supplies an output image comprising data from the display area through a D/A converter 12. The D/A converter 12 supplies an analog video signal to a display device, such as a video display 13, for displaying the output image, and to a recording device, such as a video tape recorder 14, for storing the output image on a recording medium.

The image synthesis unit 6 also performs slope calculation and polygon drawing. The polygon data in the main memory 3 which has been sorted by the CPU 2 is supplied to the image synthesis unit 6 in the sorted order and a slope is calculated by a slope calculating unit (not shown) that is part of the image synthesis unit 6. The slope calculation includes calculating a slope of a plane of a surface of the object which corresponds to the polygon. The calculated slope is used to modify mapping data for filling the polygon in the drawing of the polygon. In the case of texture mapping, the polygon is filled with texture data and in the case of Gouraud shading, the polygon is filled by luminance values. When the texture data is a texture pattern, the image synthesizing unit performs a two-dimensional mapping of the texture pattern to the polygon according to the slope data.

The coordinate transformation unit 7 executes 3-dimensional coordinate transformation and conversion of 3-dimensional data to 2-dimensional data for display on the screen. The coordinate transforming unit 7 and the main memory 3 each can invoke direct memory access (DMA) transfer of the data in the main memory by the DMA controller 8. The coordinate transformation unit 7 obtains the data from the main memory 3 through the system bus 1 and executes a coordinate transformation and/or a 3-dimensional-to-2-dimensional conversion of the data and then transfers the converted data back into the main memory 3 through the system bus 1. Data of an object represented in the 3-dimensional space comprises modeling data indicative of a shape of the object and geometry data indicative of the coordinate position and orientation of the object to be displayed.

The DMA controller 8 executes controls relevant to image synthesizing processes that use memories, such as the writing of data to memories and the reading of data from memories.

Figure 2:
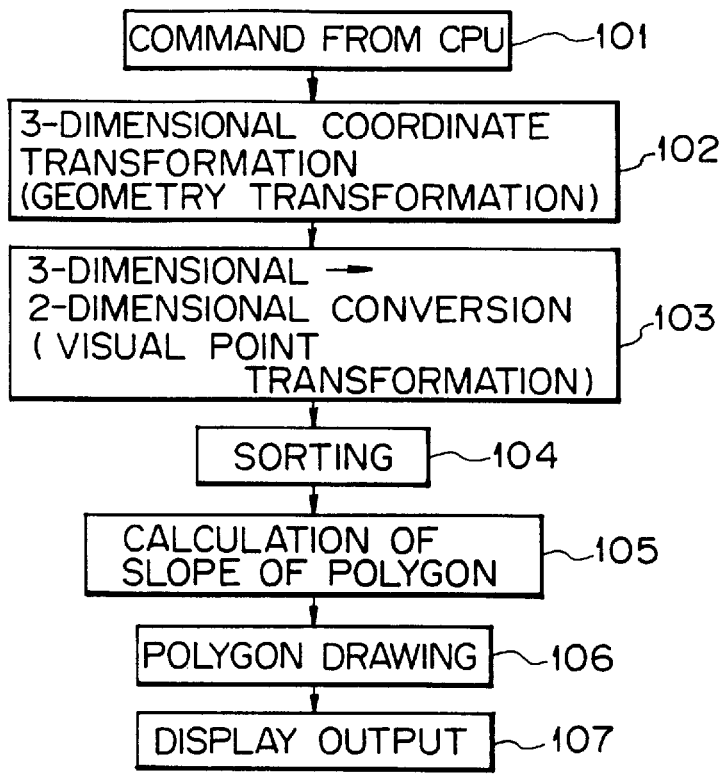
FIG. 2 is a flowchart useful in explaining an object drawing process in an embodiment of the present invention.

FIG. 2 shows a flowchart of the overall steps involved in object drawing. When a command is generated from the CPU 2 in step 101, 3-dimensional data of an object is transferred from the main memory 3 to the coordinate transformation unit 7 through the system bus 1. A 3-dimensional coordinate transformation is then executed by the coordinate transformation unit 7 in step 102, and the transformed data is converted from 3-dimensional data to 2-dimensional data in step 103. The converted data is transferred to the main memory 3 through the system bus 1 and is sorted by the CPU 2 in step 104. The data sorted by the CPU 2 is sent to the image synthesis unit 6 through the system bus 1. The slope is calculated by the image synthesis unit 6 in step 105. In step 106, a polygon to be drawn is determined, mapping data is modified according to the calculated slope, and the polygon is filled with modified mapping data. A resultant image is generated and displayed in step 107.

Figure 3:
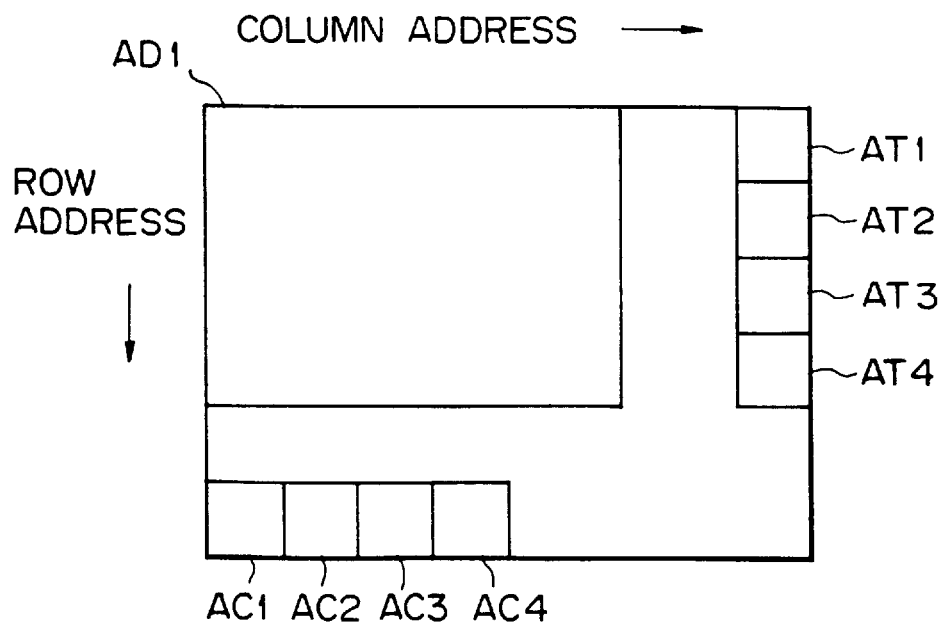
FIG. 3 is a diagram useful in explaining a memory configuration in an embodiment of the present invention.

The frame memory 10 has a texture area for storing a texture pattern, a display area for storing image data of a current frame being displayed and a drawing area for composing image data of a next frame to be displayed. FIG. 3 shows a memory space of the frame memory 10. The frame memory 10 is addressed by 2-dimensional addresses of columns and rows. In the 2-dimensional address space, areas AT1, AT2, AT3 and so on are set as texture areas. A plurality of texture patterns can be stored in the texture areas AT1, AT2, AT3 and so on. AD1 and AD2 denote interchangeable display and drawing areas. For each vertical period one of AD1 and AD2 serves a display area, and the other serves as a drawing area in which an image plane for a next frame to be displayed is developed. The areas AC1, AC2, AC3 and so on denote color look-up table (CLUT) areas.

In the case of adhering texture to a polygon that has been generated in the drawing area, texture data in one or more of the texture areas AT1, AT2, AT3 and so on is 2-dimensional mapping transformed. For example, the texture pattern TP1 stored in the texture area AT1 as shown in FIG. 4A is coordinate transformed to a shape and orientation of polygon P1 generated in drawing area AD, as shown in FIG. 4B. The 2-dimensional mapping transformed texture pattern TP1 is sent to the drawing area AD and synthesized onto the polygon P1 in the drawing area AD, as shown in FIG. 4C.

Figures 5A, 5B, 5C:
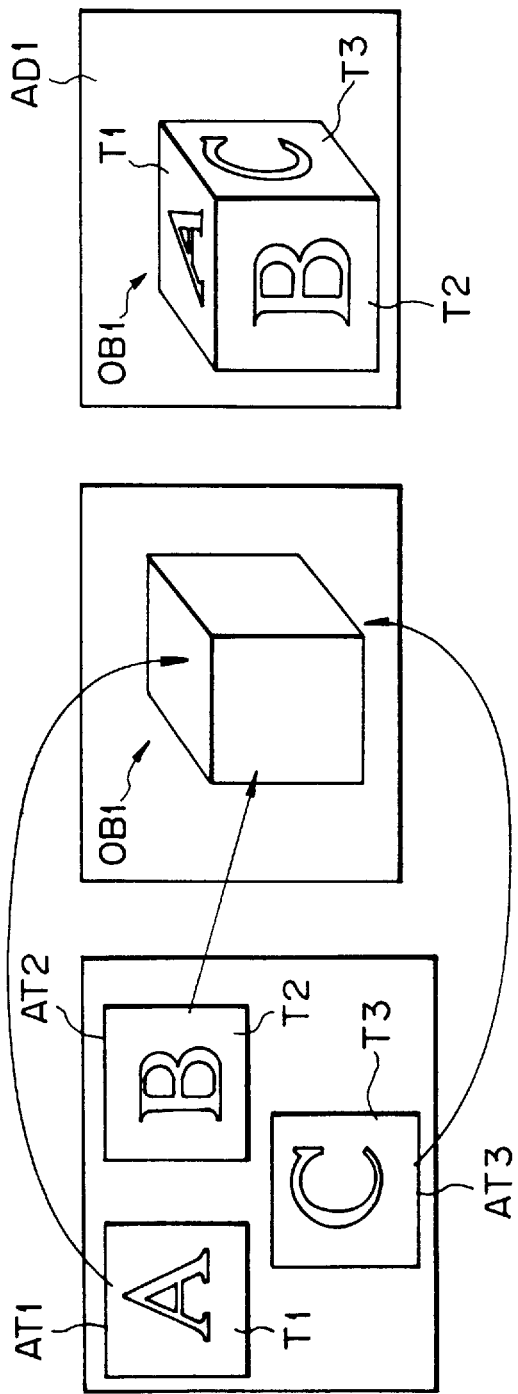
FIGS. 5A–5C are diagrams useful in explaining a second texture mapping operation in an embodiment of the present invention.

In the case of mapping textures to the surfaces of an object, texture patterns T1, T2, and T3 in texture areas AT1, AT2, and AT3 as shown in FIG. 5A are read out and are 2-dimensional mapping transformed and adhered onto respective surfaces of a solid object OB1 in drawing area AD shown in FIG. 5B. As a result, as shown in FIG. 5C, the textures T1, T2, and T3 are adhered onto the respective surfaces of the object OB1 in the drawing area AD. Prior to the next vertical period the drawing area AD becomes the display area, and in the next vertical period the image plane of the display area AD is displayed on the screen as the computer generated graphics.

In the case of a still image applied as a texture pattern, the still image texture patterns which are stored in the main memory 3 are transferred to the texture areas AT1, AT2, AT3 and so on in the frame memory 10 through the image synthesis unit 6. The image synthesis unit 6 adheres the texture patterns to the surfaces of the object which appear as polygons on the screen. The texture of the still image is realized on the object by this operation.

Further, a moving image can be applied as a texture of an object. In the case of a moving image texture, compressed moving image data from the CD-ROM is supplied by the CD-ROM decoder 5 to the image expander 4. The compressed image data is expanded by the image expander 4, and the expanded moving image data is sent to the texture areas AT1, AT2, AT3 and so on in the frame memory 10. When the size of the texture patterns permits, multiple frames of the moving image data may be stored in respective texture areas AT1, AT2, AT3 and so on in the frame memory 10. Alternatively, frames of the moving image can be dynamically written frame-by-frame to a single texture area in respective vertical periods. In either instance, a moving image texture is dynamically adhered to a surface of an object in the drawing area. As a result, changes in the texture of the object are realized.

In the case that a cyclically changing texture pattern is desired, the compressed texture data is stored in the main memory. The image expander 4 expands the compressed texture data, and supplies the expanded texture pattern data for a plurality of frames frame-by-frame to the texture areas of the frame memory.

Moving image data from a CD-ROM can be used for the entire image displayed on the screen. The compressed moving image data from the CD-ROM is decoded by the CD-ROM decoder, and then sent to image expander. The compressed image data is expanded by the image expander, and then supplied frame-by-frame to the drawing area in the frame memory during respective vertical periods, so that the frames of the moving image can be immediately displayed on the screen in respective next vertical periods.

Further, an object in the drawing area in the frame memory 10 can be moved to the texture areas. In this manner, the object with the texture pattern adhered thereto can further be set as a new texture pattern. As a result, a texture pattern having a very large change can be formed.

Figure 6:
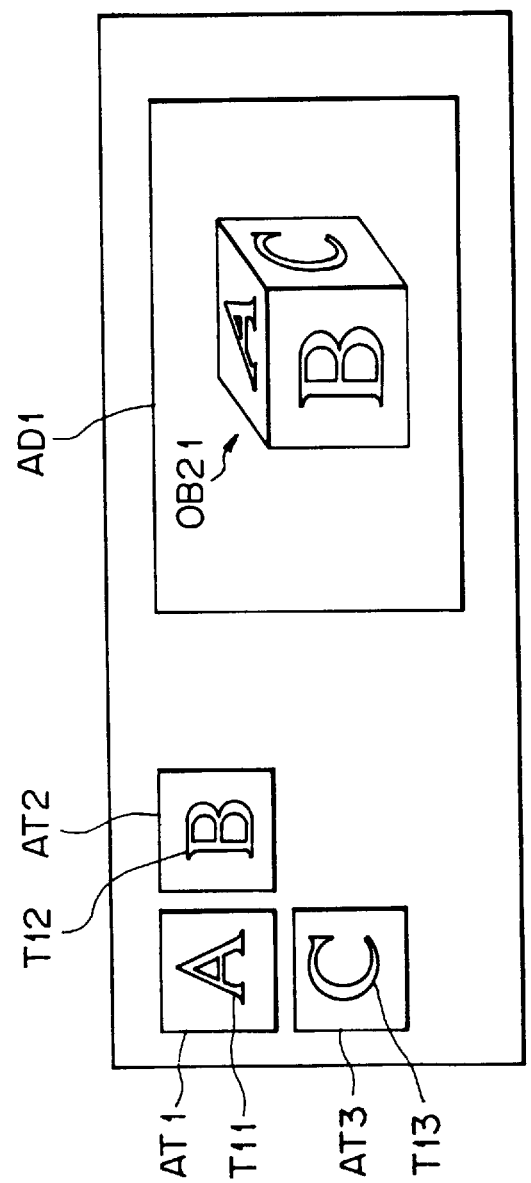
FIGS. 6 and 7 are diagrams useful in explaining a third texture mapping operation in an embodiment of the present invention.
Figure 7:
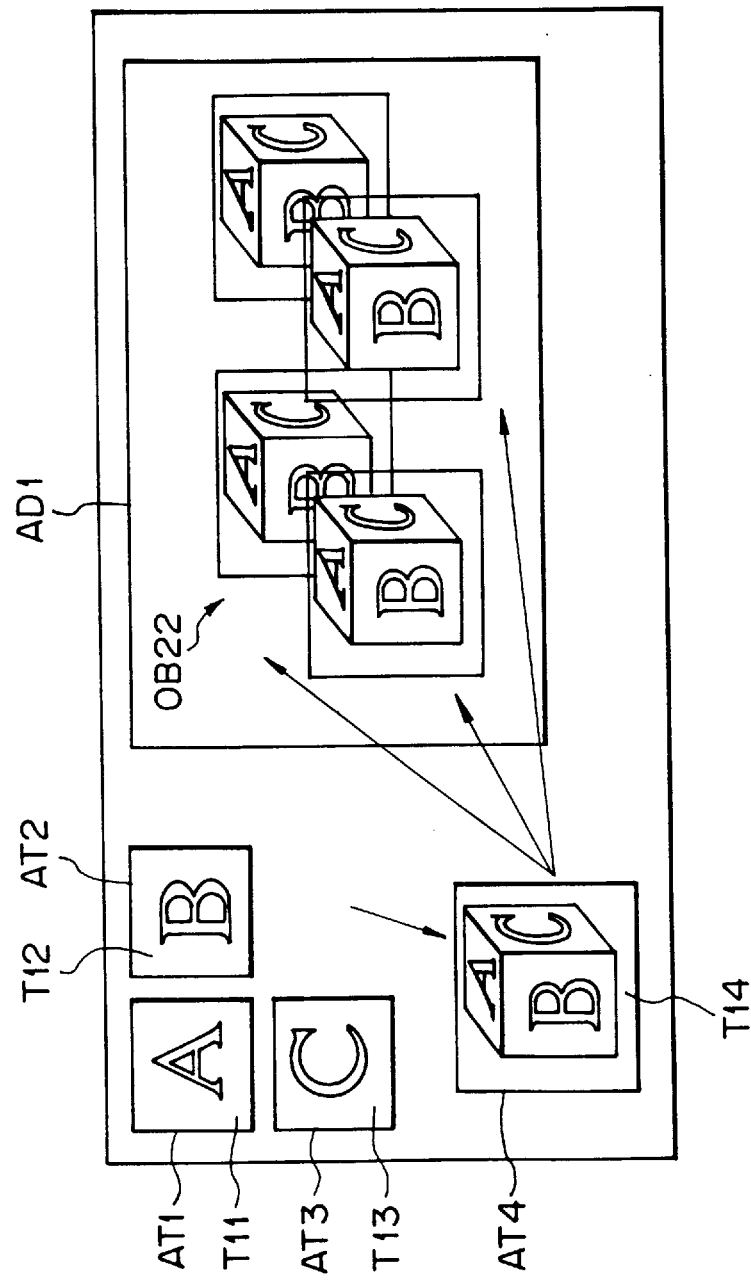

For example, as shown in FIG. 6, texture patterns T11, T12, and T13 in the texture areas AT1, AT2, and AT3, respectively, are adhered to an object OB21 in the drawing area AD1. The image plane in the drawing area AD1 is subsequently moved to the texture area AT4 and becomes a texture pattern T14. As shown in FIG. 7, the texture pattern T14 in the texture area AT4 is further adhered to an object OB22 in drawing area AD2, for example, during the next vertical period. As a result, the object OB21 to which the texture patterns T11, T12, T13 were adhered can itself become a texture pattern.

Figure 8:
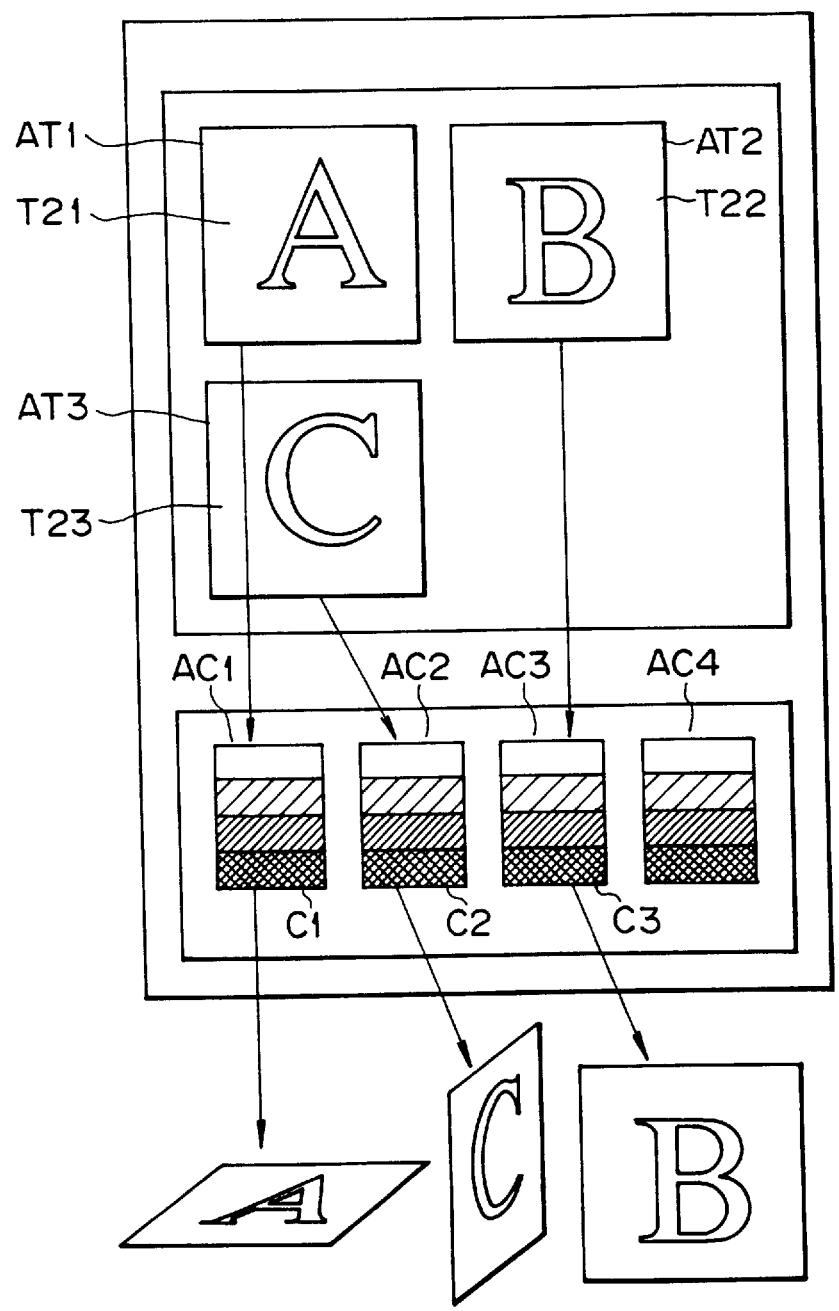
FIG. 8 is a diagram useful in explaining a color look-up table in an embodiment of the present invention.

As shown in FIG. 3, the color look-up table areas (CLUT) AC1, AC2, AC3 and so on are provided in the frame memory 10. For example, as shown in FIG. 8, CLUT tables C1, C2, C3 are provided in the areas AC1, AC2, AC3 for texture patterns T21, T22, T23, respectively. The colors of the texture patterns T21, T23, T22 are designated by the CLUT tables C1, C2, and C3, respectively.

In many cases, such as where an image is used as a texture pattern, a special color is used in the texture pattern, for example, a surface pattern of a brick. In such an image, by registering beforehand the colors that are used into the CLUT, the number of bits per pixel can be reduced. In general, the kinds of colors have a tendency to be different for the various texture patterns, for example, the surface pattern of a brick and the surface pattern of a stone. When such different surfaces must be expressed by a single CLUT, the image quality is deteriorated due to a reduced number of available colors. According to an embodiment of the invention, therefore, a plurality of CLUT tables C1, C2, C3 and so on are prepared for the respective texture patterns.

However, a one-to-one corresponding relation between CLUT tables and texture patterns is not a requirement. One CLUT table can be commonly used by a plurality of texture patterns. For example, assuming that the number of bits of the texture is equal to four, when a single CLUT table is used, the number of colors which can be expressed by the texture mapping is equal to only sixteen. However, if the CLUT table can be selected for every texture pattern, the number of colors which can be expressed is equal to 48 colors, even when the number of bits is only equal to four.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

For example, according to the embodiment described above, the image data has been compressed and recorded in the CD-ROM. However, the image data can be compressed and recorded to other recording medium, such as magnetic disc or semiconductor memory, like a memory card.

Furthermore, the image compressing method is not limited to the DCT but other compressing methods can be used advantageously.

What is claimed is:

1. A real time texture mapping method for producing a two-dimensional image of an object having a surface that has dynamically changing texture by using three-dimensional image data and two-dimensional moving image data, comprising the steps of:

(a) receiving the three-dimensional image data and the two-dimensional moving image data;

(b) transforming the three-dimensional image data to respective two-dimensional image data;

(c) storing the two-dimensional image data in a drawing area of an image memory;

(d) storing the two-dimensional moving image data frame-by-frame as texture pattern data in a texture area of the image memory; and (e) mapping a frame of the moving image data stored in the texture area per vertical display period onto the surface of the object represented by the two-dimensional image data stored in the drawing area of the image memory.

2. A real time texture mapping method according to claim 1, comprising the further step of reproducing the moving image data from a CD-ROM, the reproducing step preceding the receiving step.

3. A real time texture mapping method according to claim 1, comprising the further steps of:

calculating slope data corresponding to the two-dimensional image data; and determining polygons corresponding to respective surfaces of the object by using the calculated slope data, wherein the calculating and determining steps precede the mapping step, and the mapping step maps a frame of the moving image data stored in the texture area per vertical period to an inner portion of one of the polygons which corresponds to the surface.

4. A real time texture mapping method according to claim 1, wherein step (e) stores a plurality of frames of moving image data in a respective plurality of subareas of the texture area.

5. A real time texture mapping method according to claim 1, wherein step (e) stores a plurality of frames of moving image data in a single texture area one frame per vertical display period.

6. A real time texture mapping method for producing an image by using three-dimensional image data of an object and a dynamically changing texture pattern data, comprising the steps of:

receiving the three-dimensional image data of the object and the texture pattern data;

transforming the three-dimensional image data to respective two-dimensional image data;

storing in a drawing area of an image memory the transformed two-dimensional image data of the object to be displayed;

storing in a texture area of the image memory the received texture pattern data for decorating a surface of the object;

mapping texture pattern data stored in the texture area of the image memory onto a portion of the two-dimensional image data which corresponds to the surface of the object;

storing in the texture area of the image memory the new two-dimensional image data having the texture pattern data mapped on the surface of the object therein as new texture pattern data;

using the new two-dimensional image data having the texture pattern data mapped on the surface of the object therein as a current image frame for display; and using the new texture pattern data of the object having mapped thereon the texture pattern data as a new texture pattern to map onto a second object stored in the drawing area for a next image frame to be displayed.

7. A real time texture mapping method according to claim 6, comprising the further step of reproducing the texture pattern data from a CD-ROM, the texture pattern data from the CD-ROM comprising frames of a moving image, the reproducing step preceding the receiving step.

8. A video game apparatus for producing a video signal corresponding to an image of an object having a dynamically changing texture by using three-dimensional image data and moving image texture pattern data, comprising:

a main memory for receiving and storing said three-dimensional image data, said three-dimensional image data being indicative of shape, coordinate position and orientation of said object in three-dimensional space;

means for performing three-dimensional coordinate transformation on said three-dimensional image data stored in said main memory, for converting said transformed three-dimensional image data to respective two-dimensional image data for display on a display, and for sending said two-dimensional image data back to said main memory, said three-dimensional coordinate transformation including a geometric transformation of said object in said three-dimensional space;

receiving means for receiving said moving image texture pattern data, and for supplying said moving image texture pattern data frame-by-frame;

an image memory including a texture area for storing said moving image texture pattern data supplied frame-by-frame by said receiving means, a display area for storing image data of a current frame being displayed, and a drawing area providing a work area for composing image data of a next frame to be displayed, said two-dimensional image data of said object to be displayed in a next frame being stored in said display area;

image synthesizing means for synthesizing a dynamically changing textured image of said object by using said two-dimensional image data and said moving image texture pattern data stored in said image memory; and output means for converting said image data of a current frame which is stored in said display area to supply said video signal.

9. The video game apparatus according to claim 8, wherein said display and drawing areas of said image memory being functionally interchangeable, during a first vertical display period one of said display and drawing areas performing a first function of storing image data of a current frame being displayed and other of said display and drawing areas performing a second function as a work area for composing image data of a next frame to be displayed, and during a second vertical display period the one of said display and drawing areas performing the second function and the other of said display and drawing areas performing the first function.

10. The video game apparatus according to claim 8, further comprising:

reproducing means for reproducing compressed moving image data from a recording medium and for supplying said reproduced compressed moving image data to said receiving means, said receiving means expanding said compressed moving image data, and supplying said expanded data frame-by-frame as said moving image texture pattern data to said frame memory.

11. The video game apparatus according to claim 10, wherein said reproducing means optically reproduces said compressed moving image data from said recording medium.

12. The video game apparatus according to claim 10, said recording medium being a CD-ROM, and said reproducing means comprising:

a CD-ROM driver for reproducing data recorded on said CD-ROM;

a CD-ROM decoder connected to said system bus for decoding said compressed moving image data from said data reproduced by said CD-ROM driver and supplying said decoded compressed moving image data said receiving means.

13. The video game apparatus according to claim 8, wherein said output means comprises a digital to analog converter.

14. The video game apparatus according to claim 8, further comprising a system bus, wherein said main memory and said image synthesizing means are connected to said system bus, and said image memory is connected to said system bus through said image synthesizing means.

* * * * *